May 28, 1968     F. RÖTHEMEYER     3,384,925
SHEET EXTRUDING HEAD FOR EXTRUDING THERMOPLASTIC
SYNTHETIC RESINS

Filed Aug. 26, 1966     2 Sheets-Sheet 2

Inventor:
Friedrich Röthemeyer
By Watson, Cole, Grindle & Watson
Attys.

United States Patent Office 3,384,925
Patented May 28, 1968

3,384,925
SHEET EXTRUDING HEAD FOR EXTRUDING THERMOPLASTIC SYNTHETIC RESINS
Friedrich Röthemeyer, 2 Liebenacker Weg,
7035 Waldenbuch-Liebenau, Germany
Filed Aug. 26, 1966, Ser. No. 575,420
Claims priority, application Germany, Apr. 15, 1966,
R 43,063
2 Claims. (Cl. 18—12)

ABSTRACT OF THE DISCLOSURE

An extrusion head for extruding sheets and webs of thermoplastic synthetic resins with a start zone in the form of a circular sector and an arched equalizing zone with gap heights and a plane lip zone and the observance of the continuity condition with all the flow lines of equal length which extend normally to the isobars.

---

The invention relates to an extrusion head for extruding sheets and webs from thermoplastic synthetic resins.

Figure 1:
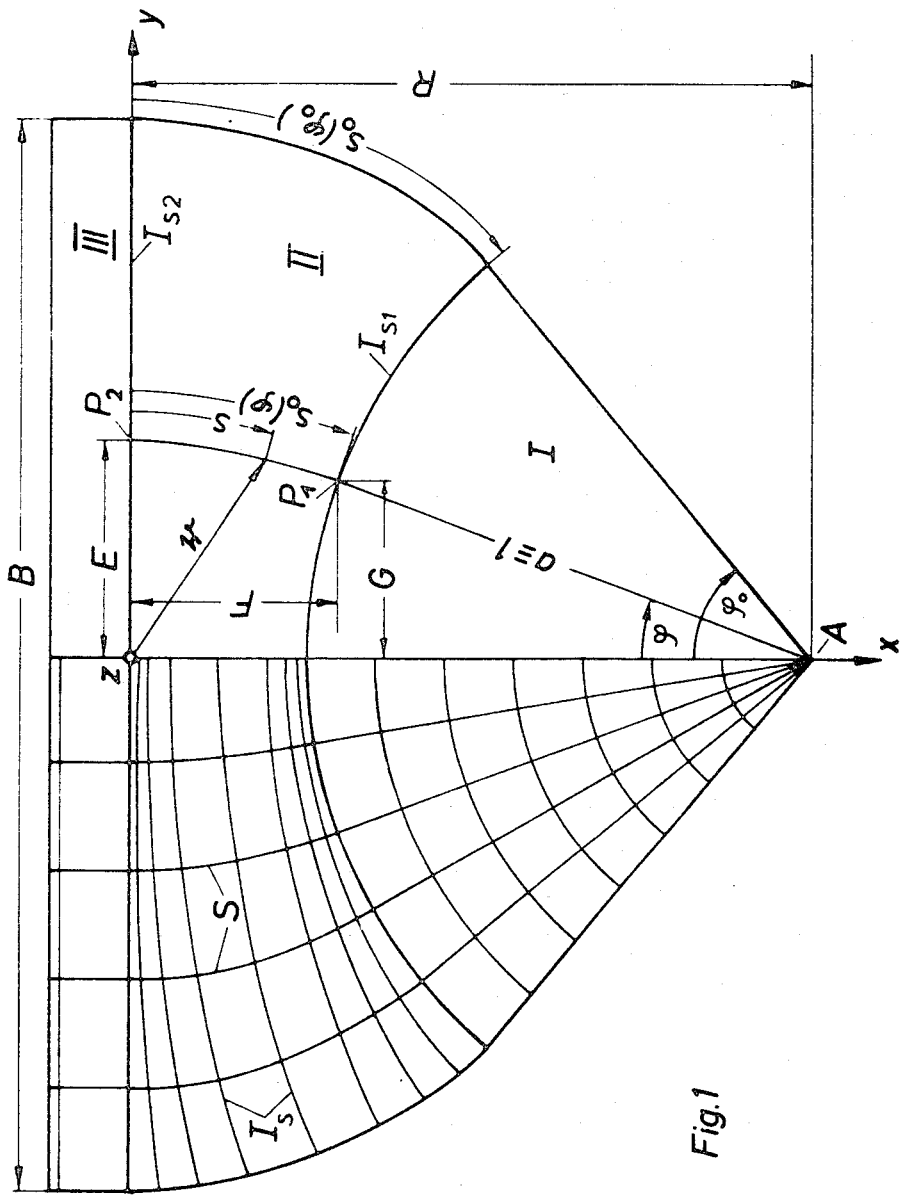
Figure 2:
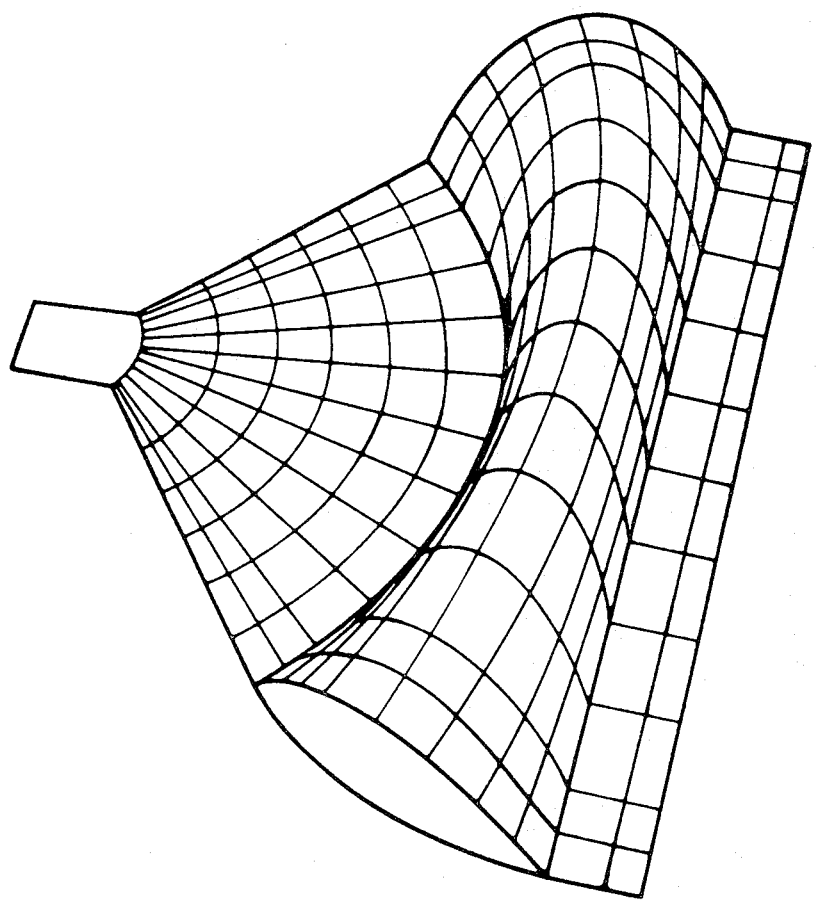

The accompanying drawings show in FIGS. 1 and 2 diagrammatic views illustrating the extruding head.

For producing fairly thick sheets and webs (more than about 0.5 mm. thick) from highly viscous polymers, extrusion heads are employed which are intended to distribute the plastics melt over the entire working width as evenly as possible while avoiding any fairly large dead spaces. The melt must leave the tool at the same rate and in the same direction throughout. If this is not the case, crease or wave formations occur in the freely emerging web. If these are "ironed out" by drawing the web off at an increased speed, the uncompensated flow conditions nevertheless make themselves noticeable as faults in the thickness of the web. Moreover, internal stresses must be expected, these having a detrimental effect when the webs divided into sheets are subsequently further processed by welding or vacuum shaping insofar as they cause warping and greatly reduce the strength of the material.

In the case of material having a markedly viscous structure, such as PVC, methacrylate resin and the like, in order to obtain a uniform structure of the extruded webs or sheets care must be taken that the melt is subjected to as uniform a shearing stress as possible over the entire working width during the extrusion. Pronounced contractions of the flow cross-section should therefore be avoided.

To achieve dwell times of constant length, sharp edges to which material could remain attached and dead spaces of rather large volume (e.g. collecting passages) must be avoided in the tool, especially for extruding PVC.

These problems can be solved by appropriate rheological shaping of the tool. The flow of melt should be so guided that every particle of material follows, in a completely smooth flow passage without any obstructing or baffling elements or pronounced contractions, flow lines which are of equal length from entry of the material into the tool until it leaves the same and run into the extrusion or shaping zone proper (lip zone) parallel to one another.

This aim, however, is only partly achieved by the extrusion heads heretofore constructed and known.

Tools wtih distributing channels and a flexible baffle strip which is arranged at the outlet end have proved to be satisfactory for thermally insensitive thermoplastics which are not too viscous. Because of the above-described problems, however, materials which have a markedly viscous structure and/or are thermally sensitive cannot be worked with these tools or can be worked with them only with great difficulty. Constructions without a collecting passage and a baffle strip (for example the so-called "fishtail" nozzle) are frequently employed for these materials. In these cases, the even distribution of the melt is intended to be achieved by means of a streamlined start zone which is determined empirically for the plastic in question and which has a constricted cross-section in its middle region. Consequently, if the kind of plastic or the operating conditions are changed, equalization of the flow is no longer ensured. Thus, this is a "single-purpose extrusion head."

Constructions are moreover known in which equalization of the flow is intended to be achieved by a path length which is the same for all the particles of the material. These constructions, however, do not fulfill their purpose if it is not taken into consideration that, with a flow of material which is of equal intensity throughout, the "paths" of equal length must at the same time be lines of shortest distance between entry into and exit from the tool.

The sheet extruding heads which have heretofore been designed on these principles, both those which are two-dimensional and those which are three-dimensional constructions, do not meet these basic requirements.

It has now been found that complete equalization of the flow can be obtained by means of a sheet extruding head consisting in manner known per se of a plane fan-shaped start zone and an arched equalizing zone with constant gap heights as well as a plane lip zone if the arched profile of the equalizing zone is dimensioned as follows (FIG. 1):

(1) The flow lines S of each particle (lines $\overline{AP_1P_2}$) must be of equal length (2) The flow lines must so extend that the continuity condition is fulfilled, i.e. the sections E on the "isobar" $I_{s2}$ must be in a constant ratio to the corresponding sections on the "isobar" $I_{s1}$ (3) The flow lines determined in this way must moreover represent the shortest distance between $I^s{}_1$ and $I^s{}_2$. This requirement means that the flow lines S and the isobars $I_s$ are normal to each other and thus represent geodetic lines.

Summing up, requirements 1 to 3 may also be formulated as follows: The circular isobars of the plane start zone I, with the aid of the equalizing zone II which is curved in space, must be converted into the isobars of the lip zone III extending parallel to each other while observing the continuity condition.

These three requirements are fulfilled with great accuracy if the equalizing zone II is given a profile the "generating vector" of which is to be calculated in accordance with the following equation:

$$W \begin{cases} g \cdot \text{arsh } \dfrac{s}{g} \\ E + g - \sqrt{s^2 + g^2} \\ \dfrac{1}{2} \cdot \sqrt{f + L_0{}^2} - \dfrac{f}{2} \cdot \text{ch } \dfrac{s_0 - 2 \cdot s}{f} \end{cases} \quad (1)$$

The term "arsh" means area sinus hyperbolicus, and "ch" stands for cosinus hyperbolicus.

In this equation, if $a$ is taken as equal to 1, so as not to be dependent on scale, see FIG. 1:

$s$ = arc length of the projections of the flow lines (independent variable)

$s_0 = s_0(\varphi) = g \cdot \text{sh } F/g$ = maximum length of arc, dependent on $\varphi$ $\varphi$ = angle between flow lines in the start zone I and axis of symmetry of the tool (independent variable)

$E = 1.22 \cdot \varphi$ $F = 1.35 - \cos \varphi$ $G = \sin \varphi$ $2 \cdot \varphi_0 = 100°$ = aperture angle of the tool $L_0 = 1.4 \cdot s_0(\varphi_0)$ = constant length of all the flow lines in the equalizing zone $R/a = 1.35$ = ratio of the depth R of the tool to the radius $a$ of the circular sector of the start zone $g$ = auxiliary quantity dependent on $\varphi$ and which must be determined from the equation $$\text{ch}\frac{F}{g} = \frac{E-G}{g} + 1$$

$f$ = auxiliary quantity dependent on $\varphi$ and which must be determined from the equation $$\text{sh}\frac{s_0}{f} = \frac{L_0}{f}$$

The letters "sh" stand for sinus hyperbolicus.

Numerical values which are calculated from the Equation 1 are referred to the radius $a=1$. This means that the shaping of the equalizing zone is a model for any desired size of tool. Scale values are obtained from the Equation 1 in accordance with the mechanics of similitude of multiplication by a scale-subject radius $a$:

$$\bar{x}(\text{mm}) = a(\text{mm}) \cdot x$$
$$\bar{y}(\text{mm}) = a(\text{mm}) \cdot y$$
$$\bar{z}(\text{mm}) = a(\text{mm}) \cdot z$$

The particular numerical value of $a$ is determined by the desired breadth B of the tool and is calculated from the equation:

$$a(\text{mm}) = 0.47 \cdot B(\text{mm})$$

To illustrate the profile of the equalizing zone, this has been calculated in accordance with above Equation 1 and is shown in perspective view in FIG. 2. The opening for the influx of the material has been given the form of a circular isobar, so as to keep the disturbances and irregularities caused by the inlet zone as small as possible.

I claim:

1. Extrusion head for extruding sheets and webs of thermoplastic synthetic resins, having a start zone in the form of a circular sector and an arched equalizing zone with constant gap heights as well as a plane lip zone, characterised in that, with observance of the continuity condition, all the flow lines S, in particular in the equalizing zone II, are of equal length and extend perpendicular relative to the isobars $I_s$.

2. Sheet extruding head according to claim 1, characterised in that the profile of the equalizing zone II is determined by the radius vector with the components $$W \begin{cases} g \cdot \text{arsh}\frac{s}{g} \\ E + g - \sqrt{s^2 + g^2} \\ \frac{1}{2} \cdot \sqrt{f^2 + L_0^2} - \frac{f}{2} \cdot \text{ch}\frac{s_0 - 2 \cdot s}{f} \end{cases}$$

References Cited

UNITED STATES PATENTS

| | | | |
|---|---|---|---|
| 2,971,222 | 2/1961 | Weissman | 18—12 |
| 3,079,634 | 3/1963 | Berger | 18—12 |
| 3,255,488 | 6/1966 | Waldherr | 18—12 |

OTHER REFERENCES

Germany printed application, 1,128,969, March 1962.

WILLIAM J. STEPHENSON, *Primary Examiner.*